(12) United States Patent
Lehtovaara

(10) Patent No.: US 6,196,940 B1
(45) Date of Patent: Mar. 6, 2001

(54) BELT TENSIONER FOR MOTOR VEHICLE

(75) Inventor: Jorma J. Lehtovaara, Etobicoke (CA)

(73) Assignee: Litens Automotive, Woodbridge (CA)

( * ) Notice: Subject to any disclaimer, the term of this patent is extended or adjusted under 35 U.S.C. 154(b) by 0 days.

(21) Appl. No.: 09/266,762

(22) Filed: Mar. 12, 1999

Related U.S. Application Data
(60) Provisional application No. 60/105,681, filed on Oct. 26, 1998, and provisional application No. 60/077,886, filed on Mar. 13, 1998.

(51) Int. Cl.⁷ ........................................................ F16H 7/10
(52) U.S. Cl. ............................................................ 474/112
(58) Field of Search ................................ 474/101, 109, 474/112, 136, 198, 199

(56) References Cited

U.S. PATENT DOCUMENTS

| | | | |
|---|---|---|---|
| 2,691,553 | 10/1954 | Pettigrew | 308/62 |
| 2,856,785 | 10/1958 | Steele | 74/242.8 |
| 3,422,692 | 1/1969 | Woodring | 74/242.1 |
| 3,636,995 | 1/1972 | Newman | 143/32 J |
| 4,655,731 | 4/1987 | Olschewski | 474/137 |
| 4,767,383 | 8/1988 | St. John | 474/133 |
| 4,832,665 | 5/1989 | Kadota et al. | |
| 4,838,101 | 6/1989 | Dobberpuhl et al. | 74/15.63 |
| 4,838,839 | 6/1989 | Watanabe et al. | |
| 5,207,620 | 5/1993 | Yamamoto et al. | |
| 5,244,438 | 9/1993 | Gotovai-Schmidt | 474/112 |
| 5,370,585 | 12/1994 | Thomey et al. | |
| 5,399,124 | 3/1995 | Yamamoto et al. | |
| 5,676,613 | 10/1997 | Valcourt et al. | |
| 5,676,615 | 10/1997 | McGrath et al. | |
| 5,759,125 * | 6/1998 | Berg | 474/112 |
| 5,820,503 * | 10/1998 | Bruchner et al. | 474/112 |
| 5,919,107 | 7/1999 | Stepniak | |

FOREIGN PATENT DOCUMENTS

| | | |
|---|---|---|
| 681910A5 | 6/1993 | (CH) . |
| 4223323C1 | 8/1993 | (DE) . |
| 4223325C1 | 10/1993 | (DE) . |
| 296 02 000 U1 | 6/1996 | (DE) . |
| 0097065A1 | 12/1983 | (EP) . |
| 491829 | 9/1938 | (GB) . |
| WO93/20368 | 10/1993 | (WO) . |

OTHER PUBLICATIONS

International Preliminary Examination Report re: PCT/CA99/00201 mailed Jun. 27, 2000.
International Search Report re: PCT/CA99/00201 mailed Jun. 29, 1999.

* cited by examiner

Primary Examiner—Dirk Wright
(74) Attorney, Agent, or Firm—Pillsbury Madison & Sutro LLP

(57) ABSTRACT

A belt tensioner for a motor vehicle engine, comprises a spindle portion and an eccentric pivoted structure mounted for pivoted movement on the spindle portion. A rotatable pulley member is mounted for rotation on the eccentric pivoted structure, and a spring is constructed and arranged to bias the eccentric pivoted structure and hence the rotatable pulley member into tensioning engagement with a belt trained about the pulley member. A force applying structure is constructed and arranged to force the spindle portion toward the belt against a counteracting belt load force applied by the belt to the rotatable pulley. Linear guiding structure is constructed and arranged to limit movement of the spindle portion to linear movement toward the belt during application of force by the force applying structure during installation of the belt tensioner.

15 Claims, 2 Drawing Sheets

BELT TENSIONER FOR MOTOR VEHICLE

This application claims priority from Provisional Application Nos. 60/077,886, filed Mar. 13, 1998 and 60/105,681, filed Oct. 26, 1998, hereby incorporated by reference in full.

BACKGROUND OF THE INVENTION

The present invention generally relates to belt tensioners and more particularly to belt tensioners that can be easily and precisely installed in operative relation with a timing or drive belt.

Belt tensioners are well known in the prior art and have been used in many belt systems heretofore. A belt tensioner is a movable support structure that rotatably supports a portion of a belt in an engine or other mechanical system. A belt tensioner is movable to compensate for increases or decreases in belt path length due to wear and other factors to provide a constant belt tensioning force on a timing or drive belt.

A common type of conventional belt tensioner includes a fixed structure and a pivoted structure pivotally mounted on the fixed structure by a pivot assembly. The pivoted structure carries a belt-engaging pulley. A coil spring is mounted in surrounding relation to the pivot assembly and the ends of the spring are connected between the fixed and pivoted structures to bias the latter with respect to the former toward a position of maximum belt take-up. The spring biasing force decreases as the pivoted structure moves from a position of minimum belt take-up to a position of maximum belt take-up. Although the spring force varies within the range of movement provided, a substantially constant tension is maintained on the belt. The principles stated above can be appreciated from U.S. Pat. No. 4,473,362.

It is also known that when a belt tensioner is installed on an engine, the tensioner should be installed to apply a predetermined static tensioning force on the belt. On some belt tensioners, this is achieved by adjusting the same so that the pivoted structure that carries the pulley is positioned between two end stops that define the range of movement for the pivoted structure. A belt tensioner should maintain the proper belt tension level throughout the entire operational angular movement of the pivoted structure.

In accordance with prior art arrangements, during the adjustment or installation of the tensioner, an eccentric adjusting member forming part of the fixed structure is rotated to move an eccentric pivoted structure eccentrically disposed about the eccentric adjusting member. Rotating the eccentric adjusting member causes the eccentric pivoted structure to move into tensioning engagement with the belt. When the belt reaches a predetermined static tension, the opposing force upon continued rotation of the eccentric adjusting member causes the eccentric pivoted structure to move away from its stop in the belt engaging direction and into a position between the stops, wherein the belt tensioning pulley is disposed in a predetermined static tensioning relation to the belt. Such arrangements are proposed in U.S. Pat. No. 5,244,438, and UK Patent No. 2,249,152.

A shortcoming in the designs of these two patents is that they both disclose belt tensioners that provide an eccentric pivoted structure that is guided for movement on the eccentric adjusting member as the eccentric adjusting member is rotated to install the tensioner in tensioning relation with the belt. Thus, the eccentric pivoted structure and pulley mounted thereon follow a generally arcuate path when moving towards the belt and into tensioning engagement therewith. In addition, the spindle on which the pivoted structure is mounted and/or a base plate on which the eccentric adjusting member is mounted undergoes a connecting rod-type movement as the eccentric adjusting member is rotated. As a result of these movements, the base plate and/or pivot shaft may be installed out of alignment for proper tensioning of the belt when the mounting bolt is fixed and the eccentric adjusting member and pivot shaft are installed in there final, installed position.

U.S. Pat. No. 5,759,125 suggests a belt tensioner arrangement comprising a rigid support base having a longitudinal slot for allowing translational displacement of the support base to adjustably secure the support base to the vehicle engine. This movement is not restricted to an arcuate, connecting-rod type movement as with the two patents mentioned above, but is free to move in any direction as dictated by an externally applied force. This freedom of movement is no better or even worse than the connecting rod type arcuate movement with regard to proper alignment of the tensioner during installation. As with the two above-mentioned patents, the support base and/or pivot shaft in the '125 patent may be installed out of alignment for proper tensioning of the belt when the tensioner mounting bolt is eventually tightened and the tensioner is installed in its final position.

SUMMARY OF THE INVENTION

It is an object of the present invention to overcome the problems found in the prior art belt tensioning devices by providing a belt tensioner that has an eccentric pivoted structure that is not guided on an inner eccentric adjusting member, but rather is mounted on a concentric spindle that is guided in a linear direction by a stud or bolt as the spindle is cammed towards the belt.

In accordance with this object, the present invention provides a belt tensioner for a motor vehicle engine, including a spindle portion, and an eccentric pivoted structure mounted for pivoted movement on the spindle portion. A rotatable pulley member is mounted for rotation on the eccentric pivoted structure, and a spring is constructed and arranged to bias the eccentric pivoted structure in a direction tending to force the rotatable pulley member into tensioning engagement with a belt trained about the pulley member. A force applying structure is constructed and arranged to force the spindle portion toward the belt against a counteracting belt load force applied by the belt to the rotatable pulley. Linear guiding structure is constructed and arranged to limit movement of the spindle portion to linear movement toward the belt during application of force by the force applying structure during installation of the belt tensioner.

The eccentric pivoted structure is mounted on a spindle portion that is concentric with respect to its internal bore, and is guided in a linear direction during installation of the tensioner.

In a preferred embodiment, the linear guiding structure includes a stud or bolt fixed to the engine frame that is received by the internal bore of the spindle portion. Because the interengagement or areas of contact between the stud or bolt and the tensioner is limited to a position above the belt centerline plane, the tilting forces applied by the belt to the tensioner during installation are counteracted. The counteracting force is enhanced because the points of engagement between the bolt or stud and rest of the tensioner is not limited to axial positions that are in axially overlapping relation with the spindle. Because the point of interengagement can be moved farther away from the pivot or bending point of the bolt or stud, the counteracting moment is greater than in prior art belt tensioner constructions.

In accordance with another object of the present invention, there is provided a method of installing a belt tensioner comprising a spindle portion. A pivoted structure is mounted on the spindle portion and a rotatable pulley member is mounted for rotation on the pivoted structure. A spring biases the pivoted structure in a direction tending to force the pulley member into tensioning engagement with a belt when the belt tensioner is installed on a motor vehicle engine. The method comprises mounting the belt tensioner on the motor vehicle engine with a relatively loose mounting bolt; moving the spindle portion in a substantially linear manner towards the belt so that the pulley is moved into forcible engagement with the belt so as to cause pivoting movement of the pivoted structure against the bias of the spring. After said tensioner is disposed in a predetermined tensioning relation with the belt, the mounting bolt is tightened so as to fix the pivot shaft in place.

Other objects and advantages of the present invention will be appreciated from the following detailed description of the drawings and the appended claims.

DETAILED DESCRIPTION OF THE PREFERRED EMBODIMENT

Figure 1:
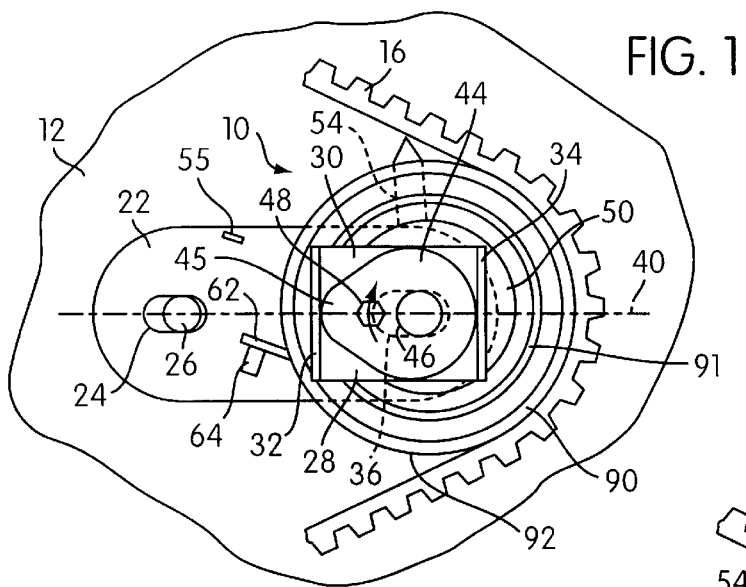
FIG. 1 is a front plan view of a belt tensioner in accordance with the principles of the present invention.

Shown in FIG. 1 is a front plan view of a belt tensioner 10 in accordance with the present invention. The belt tensioner 10 is shown mounted on an engine block or frame, generally indicated at 12, either by a threaded fixing bolt or stud and a nut (which have been removed from FIGS. 1–3 for clarity of illustration). The stud and nut are best seen in FIG. 4 (the stud is designated 14 and the nut is designated 15). In FIG. 1, the tensioner 10 is in loose, pre-installation engagement with a conventional drive or timing belt 16.

Figure 2:
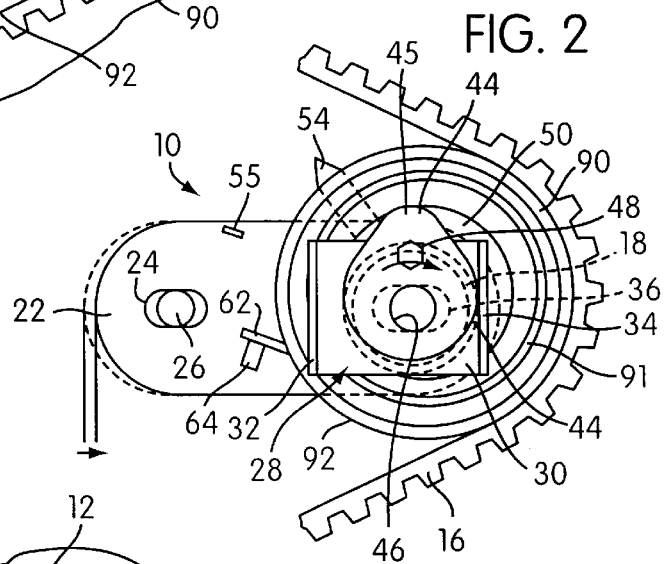
FIG. 2 is a plan view similar to FIG. 1, but showing the belt tensioner being moved towards its installed position during an installation procedure.

FIG. 2 is a plan view similar to FIG. 1, but showing the tensioner 10 in transition towards its installed position during an installation procedure.

Figure 3:
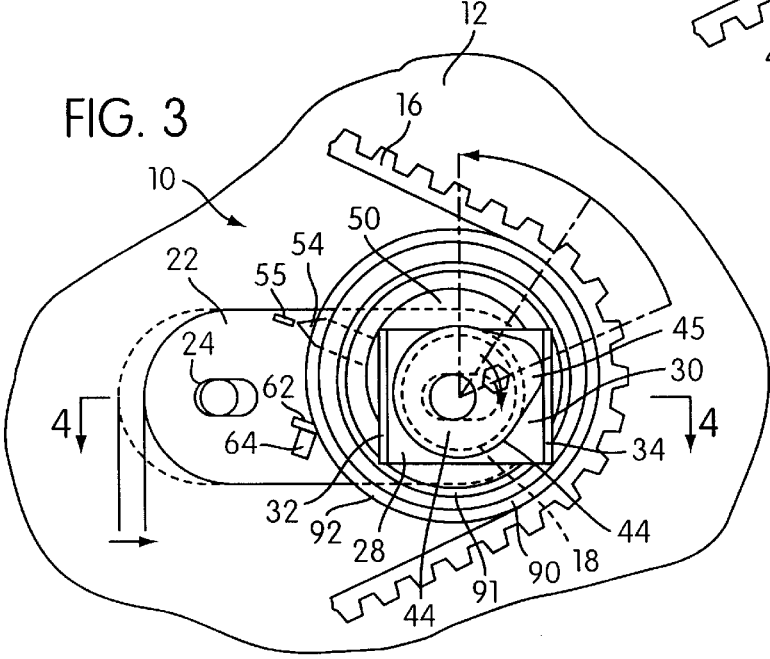
FIG. 3 is a plan view similar to FIG. 2, but showing the tensioner having been moved into installed, belt-tightening engagement with a belt.
Figure 4:
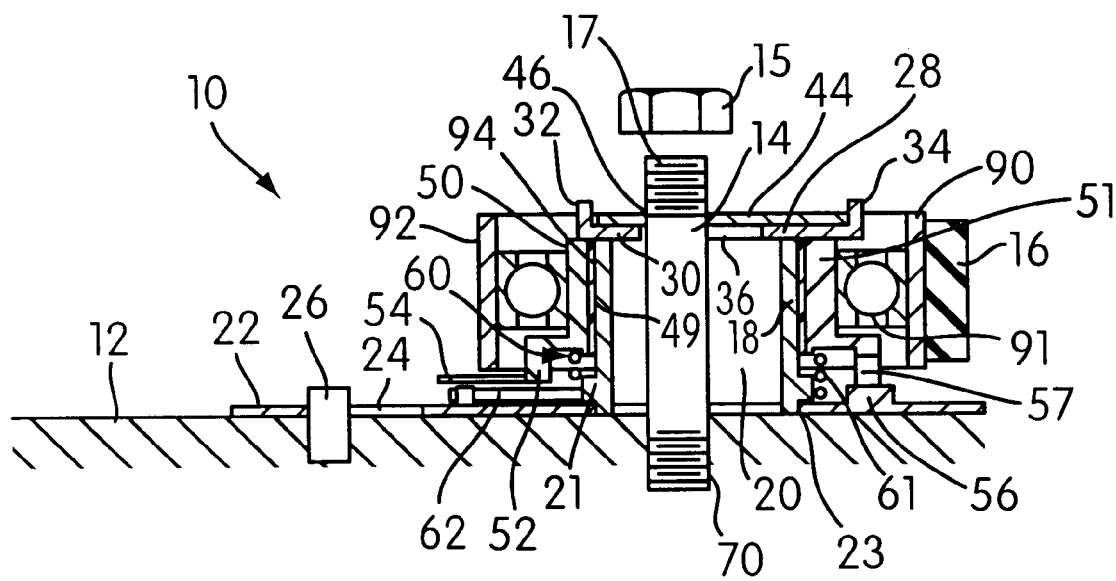
FIG. 4 is a cross-sectional view taken through the line 4—4 in FIG. 3.
Figure 5:
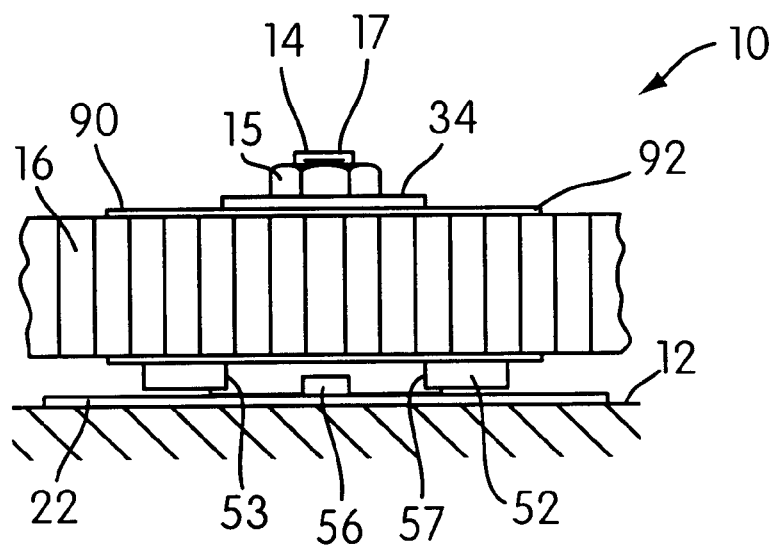
FIG. 5 is a side plan view of the tensioner for the purpose of illustrating the stop surfaces of the tensioner arm.

FIG. 3 is a plan view similar to FIG. 2, but showing the tensioner 10 having been moved into installed, belt-tightening engagement with the belt 16. When the tensioner 10 is fully installed, the nut 15 (shown in exploded view in FIG. 4 and fully tightened in FIG. 5) is tightened onto a threaded distal end 17 (shown in FIGS. 4–5) of the stud 14 (shown in FIGS. 4–5).

FIG. 4 is a cross-sectional view taken through the line 4—4 in FIG. 3 and shows the belt tensioner 10 in installed, belt-tightening engagement (except for nut 15 in exploded view) with the belt 16. As shown, the belt tensioner 10 includes a tubular, cylindrical fixed structure or spindle 18. The spindle 18 is preferably press-fit or otherwise fixed at one of its ends disposed adjacent the engine frame 12 to a mounting plate member or plate mounting portion 22. It should be appreciated that while the preferred embodiment utilizes mounting portion 22, the present invention contemplates that the mounting portion 22 can be omitted. In instances in which it is omitted, the desired linear movement of the spindle 18 during installation (described below) can be accomplished by other means (for example, by a particularly engineered interface between the spindle 18 and/or force receiving structure 28 (described below) with the stud 14).

In the embodiment shown, the one end of the spindle or spindle portion 18 is received within a circular hole 23 in the mounting plate member 22. The spindle 18 has a radially outwardly extending annular flange 21 adjacent the one end. The annular surface of the flange 21 abutting the mounting plate member 22 may optionally be welded to the plate member 22. Because the spindle 18 has its lower end firmly received in the opening 23 of the mounting plate member 22, linear movement of the spindle toward and away from the belt 16 during installation of the belt tensioner 10 will move the plate member 22 therewith. These two members need not be welded to one another, however, and it is contemplated that these members may be axially separated from one another upon application of sufficient force. The spindle 18 has an interior cavity 20 extending therethrough. The cavity 20 receives the fixed stud 14.

As can be best appreciated when viewing FIG. 4 in conjunction with FIGS. 1–3, the mounting plate member 22 has an elongated or oblong slot 24 formed therein. The slot 24 receives a pin 26 extending from the engine frame 12. An installation force receiving structure 28 is fixed to an end of the spindle 18 opposite the end adjacent the mounting plate member 22. In the embodiment shown, the installation force receiving structure 28 has a main square or rectangular portion 30 and outwardly extending parallel flanges 32, 34 extending from two sides of the portion 30. The flanges 32, 34 are parallel to one another and perpendicular to the linear path of movement through which the mounting plate member 22 travels during installation of the tensioner 10 as is described in greater detail below. The underside of portion 30 of the installation force receiving structure 28 is fixed to the circular upper end of spindle 18, for example by being welded.

The square main portion 30 of the force receiving structure 28 preferably has an elongate or oblong slot 36 formed therein. The length of the slot 36 extends generally perpendicular to the extending direction of parallel flanges 32, 34. An imaginary plane extending along the length of the slot 36 and splitting the width thereof also extends along the length and splits the thickness of the slot 24 in the mounting plate member 22. This imaginary plane is indicated by the dashed line given reference numeral 40 in FIG. 1.

The fixed stud 14 extends through the elongate slot 36 in the force receiving structure 28, similar to the manner in which the pin 26 extends through the elongate slot 24 in the mounting plate member 22. The pin 26 within the slot 24 and the stud 14 within the slot 36 cooperatively constitute a linear guiding structure that limits movement of the spindle 18 to linear movement during installation of the belt tensioner 10. More specifically interengagement of the linear guiding structure components cooperatively function to limit movement of the spindle 18 in a linear direction parallel to plane 40 and prevent rotation of the spindle 18 during installation of the tensioner 10.

Preferably there is minimal clearance between the slots 24, 36 and associated pin 26/stud 14, so that the stud 14 slidably engages the opposing straight edge portions defining the slot 36, and the pin 26 engages the opposing straight edge portions defining the slot 24 during movement of the mounting plate member 22 during installation of the tensioner 10 to ensure that the movement of the plate member 22 is linear during installation. In this regard, the dimensions of the slots 24, 36 and the dimensions of the pin 26 and stud 14 must be coordinated so that there is direct contact or minimal clearance between the pin 26 and the opposing straight edges of slot 24, and direct contact or minimal clearance between the stud 14 and the opposing straight edges of the slot 36.

In an alternate preferred embodiment (not shown) a slot of similar dimensions to slot 36 is provided within the plate member 22 at a portion thereof which extends radially inwardly relative to the radius of the spindle 18. The spindle 18 is welded so as to be fixed at its bottom end to the plate member 22. The slot in the plate member receives the stud 14 and serves the same function as slot 36. Thus, if desired, the slot 36 in the portion 30 of the force receiving portion 28 can be eliminated (e.g., a circular hole can be provided in portion 30 that does not have any edges which engage the stud 14).

As another preferred alternative embodiment, the mounting plate member 22 is omitted, and the spindle 18 is provided with one or more projections that are engaged within a linear groove formed in the engine frame 12. This engagement, in combination with a linear slot 36 provided in the force receiving structure 28 and/or a linear slot formed in the spindle 18 itself (e.g., a bore through the spindle) that receives the stud 14 would serve the linear guide function.

From the above exemplary embodiments, it can be appreciated that the linear guiding structure contemplated by the present invention may be any combination of slots and pins, or any sort of track or cooperating surfaces between the tensioner and the engine that can be used to guide the spindle 18 in a linear direction when the spindle 18 is forced towards the belt.

A force applying structure, preferably in the form of cam structure 44, is mounted on the upper surface of portion 30 of the force receiving structure 28. The cam structure 44 can be moved to apply a camming or wedging force to the force receiving member 28 in order to move the force receiving member 28, spindle 18 fixed to the member 28 and the mounting plate member 22 in a linear direction toward the belt 16 during installation of the belt tensioner 10. The force receiving member 28, the spindle 36 and the mounting plate member 22 are guided in the linear direction as a result of the engagement between stud 14 in slot 36 and the engagement between pin 26 in slot 24.

Preferably the cam structure 44 is a flat, cam-shaped member having a prominent outer edge portion 45 and an opening 46 for receiving the fixed stud 14 therethrough. The cam structure 44 also has a tool receiving opening 48 for receiving an installation tool that can be used to pivot the cam structure 44 about the stud 14 (in a clockwise direction as viewed in FIGS. 1–3) during installation of the tensioner 10. This movement of the cam structure 44 causes the wider portion of the cam structure 44 formed by the prominent edge portion 45 to be forced between the stud 14 and the flange 34 of the force receiving structure 28. The cam structure 44 thus forces or wedges the flange 34, and hence the spindle 18 fixed to the force receiving structure 28 and the mounting plate member 22 fixed to the spindle 18, away from the stud 14 and toward the belt 16 in a linear movement as previously described. It should be appreciated, however, that the force applying structure can take the form of any rigid structure which could be used as a wedge between the stationary stud 14 and the spindle portion 18 so as to force the spindle portion 18 and mounting plate member 22 into tensioning engagement with the belt 16.

The belt tensioner 10 is first loosely mounted on the engine frame 12 by the stud 14 and the belt 16 is loosely trained about the tensioner. The belt tensioner 10 is then moved toward the belt 16 by the camming structure 44 so that the tensioner 10 applies an appropriate static tensioning force on the belt, as will be described later in greater detail.

A cylindrical sleeve bearing 49, preferably made from PTFE, or the like is optionally disposed in engagement with the cylindrical exterior surface of spindle 18. An eccentric lever arm 50 constitutes a pivoted structure that pivots about the spindle 18 and the surrounding sleeve bearing 49 during operation of the tensioner 10. The sleeve bearing 49 is thus disposed between the lever arm 50 and the spindle 18 and facilitates the pivoting movement of the lever arm with respect to the spindle 18 during operation of the tensioner 10.

The eccentric lever arm 50 has an eccentric tubular portion 51 and a cylindrical skirt portion 52. The tubular portion 51 has a cylindrical exterior surface, and a cylindrical longitudinal bore that engages the sleeve bearing 49. The center axis of the longitudinal bore is radially displaced relative to the central axis of the cylindrical exterior surface of the eccentric lever arm 50 so that the two axes are parallel but not co-linear. Thus, the eccentric lever arm or pivoted structure 50 is eccentrically disposed relative to the cylindrical spindle 18 and sleeve bearing 49.

The cylindrical skirt portion 52 of the eccentric lever arm 50 is disposed in radially outwardly spaced, concentrically surrounding relation to the cylindrical exterior surface of the eccentric tubular portion 51. As can be appreciated from FIGS. 1–4, a radially projecting pointer 54 is integrally formed with the skirt portion 52 of the eccentric lever arm 50 and extends radially outwardly from the cylindrical exterior of the skirt portion 52. The pointer 54 is aligned with a mark 55 on the mounting plate member 22 during installation of the belt tensioner 10 to make certain that the tensioner engages the belt 16 with a predetermined amount of static belt load force during the initial set-up. Aligning the pointer 54 with the mark 55 also ensures that optional stop surfaces 53, 57 preferably provided on the skirt portion 52 are disposed at respective desired distances from an optional rigid stop structure 56 projecting outwardly from the mounting plate member 22 (in the preferred embodiment where the mounting plate member 22 is provided).

The stop surfaces 53, 57 are formed from edges on opposite sides of a gap or discontinuity in the circumferential extent of the skirt portion 52. The stop surface 53 of the eccentric lever arm 50 engages the stop structure 56 when the tensioner 10 is deflected away from the belt 16 (counterclockwise as viewed in FIGS. 1–3) with a predetermined force to prevent the tensioner 10 from being deflected to such an extent that the belt would become slack and potentially cause tooth skip between the belt 16 and some other sprocket about which the belt is trained (for example, in a serpentine belt drive system).

The optional stop surface 57 of the eccentric lever arm 50 serves to engage the stop structure 56 when the tensioner 10 is moved a predetermined extent by the spring 60 towards the belt. The engagement of surface 57 with stop structure 56 prevents movement of the tensioner 10 toward the belt 16 to an extent that would be more than desired and that would potentially cause the tensioner to lock-up against the belt 16.

Although the stop surfaces 53, 57 and stop structure 56 are preferred, they are optional in the that the present invention contemplates that no defined stops need to be provided. After the tensioner is installed, it may be positioned essentially solely as a function of belt tension, and need not be limited to defined movement between stops.

A torsion spring 60 is connected between the mounting plate member 22 and the eccentric lever arm 50. The spring 60 has a main portion 61 coiled freely about the spindle 18 and a spring extension portion 62 extending outwardly from the end of the main portion 61 of the spring 60 closest to the mounting plate member 22. The spring extension portion 62 engages a spring stop 64 that is fixed to or formed integrally with the spindle 18 or the mounting plate member 22. The interengagement between the spring extension portion 62 and the spring stop 64 prevents the spring 60 from uncoiling in a counterclockwise direction (as viewed in the FIGS. 1–3). The other end (not shown) of the torsion spring 60 forms a connection with the eccentric lever arm 50. The connection between the other end of the torsion spring 60 and the eccentric lever arm 50 is conventional and operates to bias the eccentric lever arm 50 in a clockwise direction (as viewed in FIGS. 1–3) about the bearing sleeve 49 and spindle 18.

A belt-engaging pulley 90 is annularly disposed about the eccentric lever arm 50 in conventional fashion. In the preferred embodiment, the pulley 90 is rotatably mounted on the eccentric lever arm 50 with a ball bearing assembly 91. The ball bearing assembly 91 (best seen in FIG. 4) is mounted between an inner, concave cylindrical surface of the pulley 90 and an outer, convex cylindrical surface of the eccentric lever arm 50. An exterior annular surface 92 on the pulley 90 engages the belt 16.

Installation and Operation of the Belt Tensioner

Initially, the fixed stud 14 is threadedly engaged with a threaded opening 70 in the engine block 12 to rigidly fix the stud 14 to the engine block. The belt tensioner 10 is mounted on the pin 26 and the stud 14. The nut 15 is placed on the stud 14 and loosely tightened to allow the tensioner 10 to move with respect to the engine block 12. The belt 16 is trained around the tensioner 10.

An appropriate installation and adjusting tool (not shown) is inserted within the hexagonal opening 48 on the cam member 44 and the cam member 44 is rotated with the tool to move the surface 92 of the pulley 90 into tensioning engagement with the belt 16. In particular, because the nut 15 is not initially tightened, the cam member 44 is permitted to rotate about the stud 14 and the entire tensioner 10 is permitted to move in a linear direction parallel to plane 40 as the cam member 44 is rotated to move the force receiving member 28 and other components toward the belt 16 (to the right in FIGS. 1–3).

During this initial rotation of the cam member 44 with the tool, the pivoted position of the eccentric lever arm 50 remains substantially stationary because there is insufficient belt load torque transmitted by the belt 16 to the eccentric lever arm 50 to overcome the opposing spring torque of the torsion spring 60 on the lever arm 50. When sufficient tension is applied to the belt 16, the opposing belt load torque applied by the belt 16 through the eccentric lever arm 50 to the torsion spring 60 is sufficient to overcome the spring torque applied by the spring 60. This causes the eccentric lever arm 50 to rotate during movement of the cam member 44 against the biasing force of the torsion spring 60.

Before the eccentric lever arm 50 begins rotating, the stop surface 57 of the eccentric lever arm 50 rests in resiliently biased engagement with the stop member 56. When the eccentric lever arm 50 begins to rotate, the stop surface 57 is moves away from the stop member 56 and the pointer 54 is brought into alignment with the mark 55. At this rotational or angular position of the eccentric lever arm 50, the torsion spring 60 is adjusted such that the predetermined desired static tensioning force is applied against the belt 16 and the stop surfaces 53 and 57 are properly spaced from stop member 56. The nut 15 is then tightened to install the belt tensioner 10 and fix the cam member 44 in place. The downward axial force exerted on the spindle 18 by the tightened nut 15 fixes the spindle 18 and the mounting plate member 22 in their proper installation positions relative to the pin 26, the stud 14, and the belt 16.

When the tensioner 10 is installed, the eccentric lever arm 50 free to pivot about the spindle 18, but the range of pivotal movement of the lever arm 50 is limited by the stop surfaces 53, 57 and the stop structure 56. The torsion spring 60 maintains the proper tension on the belt 16 when the engine is operating. More particularly, when the belt 16 slackens during operation of the engine, the torsion spring 60 rotates the eccentric lever arm 50 so that the stop surface 57 approaches the stop structure 56 and so that the eccentric configuration of the inner eccentric portion 51 of eccentric lever arm 50 causes the pulley 90 to be moved in the belt engaging direction (to the right in FIGS. 1–3) to take-up the slack in the belt 16. In contrast, when the belt 16 is tensioned during operation of the engine, the belt 16 applies a load force that causes the eccentric lever arm 50 to be rotated in an opposite direction so that the stop surface 53 approaches the stop structure 56 and the pulley 90 to move in a direction opposite the belt engaging direction against the force of the spring 60.

It can be appreciated from FIG. 4 that the load force applied by the belt 16 on the tensioner 10 is to the left in the figure. In prior art constructions, as the tensioner is moved into tensioning engagement with the belt during installation, this belt load force has a tendency to tilt entire tensioner and the loosely installed bolt in a direction away from the belt. More specifically, in the prior art the upper portions or distal ends of the stud 14 and tensioner 10 (i.e., the ends farthest from or distal to the engine block) are tilted or bent away from the belt (to the left in FIG. 4). In accordance with a further object of the present invention, the present invention counteracts this tilting effect by isolating the area of contact between the tensioner 10 and the stud 14 to the portions which are disposed above an imaginary belt centerline plane which bisects the width of the belt 16.

More specifically, the points of contact between the stud 14 and tensioner 10 that counteract the tilting or bending force on the stud are limited to the engagement between the camming structure 44 and the stud 14. Otherwise stated, the belt centerline plane which bisects the width of the belt 16 is disposed closer to the mounting surface of the engine block 12 than to the isolated portions of engagement between the tensioner 10 and stud 14/nut 15 that oppose the tilting force of the belt 16, which portions are limited to the engagement of cam structure 44 with the stud 14/nut 15.

In accordance with the preferred embodiment of the present invention, the areas of contact between the camming structure 44 and the stud 14/nut 15 are spaced sufficiently far from the belt centerline plane that the areas of contact are disposed axially beyond the distal end 94 of the spindle 18. It can be appreciated from FIG. 4 that, in the preferred embodiment, the areas of contact between the camming structure 44 and stud 14/nut 15 are sufficiently spaced from the belt centerline plane such that the areas of contact are disposed at an axial position beyond an axial position in which it would be in axially overlapping relation with the axial extent of the spindle or in axially overlapping relation with the axial extent of the ball bearing assembly 91. Because the points of engagement between the stud 14 and the rest of the tensioner (e.g., at cam 44) are not limited to axial positions that are in axially overlapping relation with the spindle 18, the tilt or bending counteracting force is enhanced. Because the areas of contact can be moved farther away from the pivot or bending point of the stud 14, the counteracting moment arm exerted on the stud by the tensioner is greater than is found in prior art tensioner constructions in which the points of contact are in axially overlapping relation with the spindle, such as in U.S. patent application Ser. No. 08/077,886.

The anti-tilting arrangement of the tensioner 10 in accordance with the present invention can be more fully appreciated from U.S. patent application Ser. No. 08/077,886, hereby incorporated fully by reference. The embodiments in that application are bolts or studs that are not fully tightened until installation is complete, and thus undergo a greater degree of tilting in comparison with the fully tightened stud employed with the presently described invention. However, tilting in the present invention occurs as a result of bending of stud 14 during installation. This bending type of tilting is counteracted in accordance with the present invention.

One skilled in the art will understand that the preferred embodiment of the belt tensioner described and illustrated herein is exemplary only and not intended to be limiting. Rather, the belt tensioner 10 is intended to convey the broad teachings of the invention. Because the camming structure is not within the spindle, the spindle is not forced to travel orbitally as it moves toward the belt. The camming structure contacts and drives these structures in the desired direction of travel which makes true, straight line travel toward the belt possible.

While the invention has been described by way of exemplary embodiments, it should be understood that such specifically described embodiments are illustrative of the invention, not limiting. Changes may be made within the purview of the appended claims, without departing from the spirit and scope of the invention in its broader aspects. Thus, this invention extends to all equivalent structures, mechanisms, and elements which are within the spirit and scope of the appended claims.

What is claimed is:

1. A belt tensioner for a motor vehicle engine, comprising:
   a spindle portion;
   an eccentric pivoted structure mounted for pivoted movement on the spindle portion;
   a rotatable pulley member mounted for rotation on the eccentric pivoted structure;
   a spring constructed and arranged to bias the eccentric pivoted structure in a direction tending to force the rotatable pulley member into tensioning engagement with a belt trained about the pulley member;
   a force applying structure constructed and arranged to force the spindle portion toward the belt against a counteracting belt load force applied by the belt to the rotatable pulley; and
   linear guiding structure constructed and arranged to limit movement of the spindle portion to linear movement toward the belt during application of force by the force applying structure during installation of the belt tensioner.

2. A belt tensioner according to claim 1, wherein said linear guiding structure comprises:
   i) an elongated slot disposed in one of said belt tensioner and said motor vehicle engine, and
   ii) a protrusion extending into said slot and disposed on another of said belt tensioner and said motor vehicle engine.

3. A belt tensioner according to claim 2, wherein said elongated slot is in said motor vehicle engine and said protrusion is carried by said belt tensioner.

4. A belt tensioner according to claim 3, further comprising a base plate, said base plate having said protrusion received in said slot in said motor vehicle engine.

5. A belt tensioner according to claim 2, wherein said elongated slot is provided in said belt tensioner, and wherein said protrusion is provided by said motor vehicle engine.

6. A belt tensioner according to claim 5, further comprising a base plate, and wherein said elongated slot is provided in said base plate for receiving said protrusion from said motor vehicle engine.

7. A belt tensioner according to claim 2, further comprising a mounting bolt constructed and arranged to mount the bolt tensioner on the motor vehicle engine, said mounting bolt extending through said spindle portion, wherein said linear guiding structure further comprises surface portions of interengagement between said mounting bolt and adjoining surfaces of said tensioner defining an elongated slot, said bolt and said elongated slot permitting linear movement of said pivot shaft towards said belt.

8. A belt tensioner according to claim 1, further comprising a mounting bolt that mounts the tensioner on the motor vehicle engine, said mounting bolt engaging adjacent surfaces of said belt tensioner so as to form part of said linear guiding structure.

9. A belt tensioner according to claim 2, further comprising a mounting bolt constructed and arranged to mount the tensioner on the motor vehicle engine, said mounting bolt engaging adjacent surfaces of said belt tensioner so as to form part of said linear guiding structure.

10. A belt tensioner according to claim 8, wherein said mounting bolt is constructed and arranged to extend through said spindle portion.

11. A belt tensioner according to claim 1, further comprising a force receiving structure connected with said spindle portion, and wherein said force applying structure is a camming structure being manually movable to force said force receiving structure and hence said spindle portion linearly toward said belt.

12. A belt tensioner according to claim 11, further comprising a mounting bolt for mounting the tensioner on the motor vehicle engine, wherein said force receiving structure has a slot, and wherein said mounting bolt extends through said slot in the force receiving structure, said mounting bolt and said slot being cooperable to constitute a portion of said linear guiding structure.

13. A method of installing a belt tensioner comprising a spindle portion, a pivoted structure mounted on the spindle portion, a rotatable pulley member mounted for rotation on the pivoted structure, a spring that biases the pivoted structure in a direction tending to force the pulley member into tensioning engagement with a belt when the belt tensioner is installed on a motor vehicle engine, said method comprising:
   mounting the belt tensioner on the motor vehicle engine with a relatively loose mounting bolt;
   moving the spindle portion relative to said bolt in a substantially linear manner towards said belt so that said pulley is moved into forcible engagement with said belt so as to cause pivoting movement of said pivoted structure against the bias of said spring, and after said tensioner is disposed in a predetermined tensioning relation with said belt, tightening said mounting bolt so as to fix said spindle portion in place.

14. A method according to claim 13, wherein said belt tensioner comprises a camming structure, and further comprising moving said camming structure to apply a force that moves the spindle portion towards the belt and moves the belt tensioner into tensioning engagement with said belt.

15. A method according to claim 14, where in said camming structure applies said force to said tensioner at a location that tends to balance the belt load tilting force applied by the belt upon the tensioner as said tensioner is moved into tensioning engagement with the belt.

* * * * *